(12) United States Patent
Fujimaki et al.

(10) Patent No.: US 7,041,334 B2
(45) Date of Patent: May 9, 2006

(54) OPTICAL FIBER DRAWING DIE AND DRAWING METHOD THEREFOR

(75) Inventors: Munehisa Fujimaki, Sakura (JP); Takahiro Hamada, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/313,402

(22) Filed: Dec. 6, 2002

(65) Prior Publication Data

US 2003/0136340 A1    Jul. 24, 2003

(30) Foreign Application Priority Data

Dec. 13, 2001    (JP) .............................. 2001-380571

(51) Int. Cl.
 *B05D 5/06* (2006.01)
(52) U.S. Cl. .................................... 427/163.2; 118/125
(58) Field of Classification Search ................ 118/420, 118/125, DIG. 18, 405; 427/163.2, 434.6, 427/356, 407.2, 407.3; 65/529; 425/113
See application file for complete search history.

(56) References Cited

U.S. PATENT DOCUMENTS 4,264,649 A * 4/1981 Claypoole et al.
5,127,361 A * 7/1992 Matsuda et al.

FOREIGN PATENT DOCUMENTS

| JP | 63112443 | 5/1988 |
|---|---|---|
| JP | 4124048 | 4/1992 |
| JP | 9086970 | 3/1997 |
| JP | 10316452 | 12/1998 |
| JP | 10338551 | 12/1998 |

OTHER PUBLICATIONS

M. Wagatsuma, T. Kimura, S. Yamakawa, Slip Mechanism in Optical Fiber Coating with Open-Cup Applicators:, *Journal of Lightwave Technology*, Vo. LT-4, No. 9 (1986).

* cited by examiner

*Primary Examiner*—Brenda A. Lamb
(74) *Attorney, Agent, or Firm*—Hoffman & Baron, LLP

(57) ABSTRACT

An optical fiber coating die is made such that an interfacial shear rate of the optical fiber to the resin coat is calculated in accordance with a pressure value of resin inside a coating cup, and the interfacial shear rate is in a range of $-1.5\times10^5$ to $0$ $sec^{-1}$. Also, an optical fiber drawing die is made such that the interfacial shear rate of the optical fiber to the resin coat is calculated in accordance with a diameter of a coating resin, and the interfacial shear rate is in a range of range of $-3\times10^5$ to $2\times10^5$ $sec^{-1}$. By doing this, an optical fiber drawing die which can be used in an optical fiber drawing method so as to realize stable resin coating operation even in high-speed drawing operation and high productivity can be realized.

5 Claims, 4 Drawing Sheets

OPTICAL FIBER DRAWING DIE AND DRAWING METHOD THEREFOR

BACKGROUND OF THE INVENTION

1. Field of the Invention

The present invention relates to coating die which is used for drawing an optical fiber, and to an optical fiber drawing method therefor.

2. Description of Related Art

It is common for a plurality of resin coating to be applied to an optical fiber from a viewpoint of maintaining mechanical strength and transmission characteristics. An ultraviolet curable resin having relatively lower Young's modulus are applied to an optical fiber as a first coating layer and an ultraviolet curable resin having relatively higher Youngs modulus and a second coating layer.

An optical fiber drawing apparatus for applying an ultraviolet curable resin is explained with reference to FIG. 2 as follows.

Figure 2:
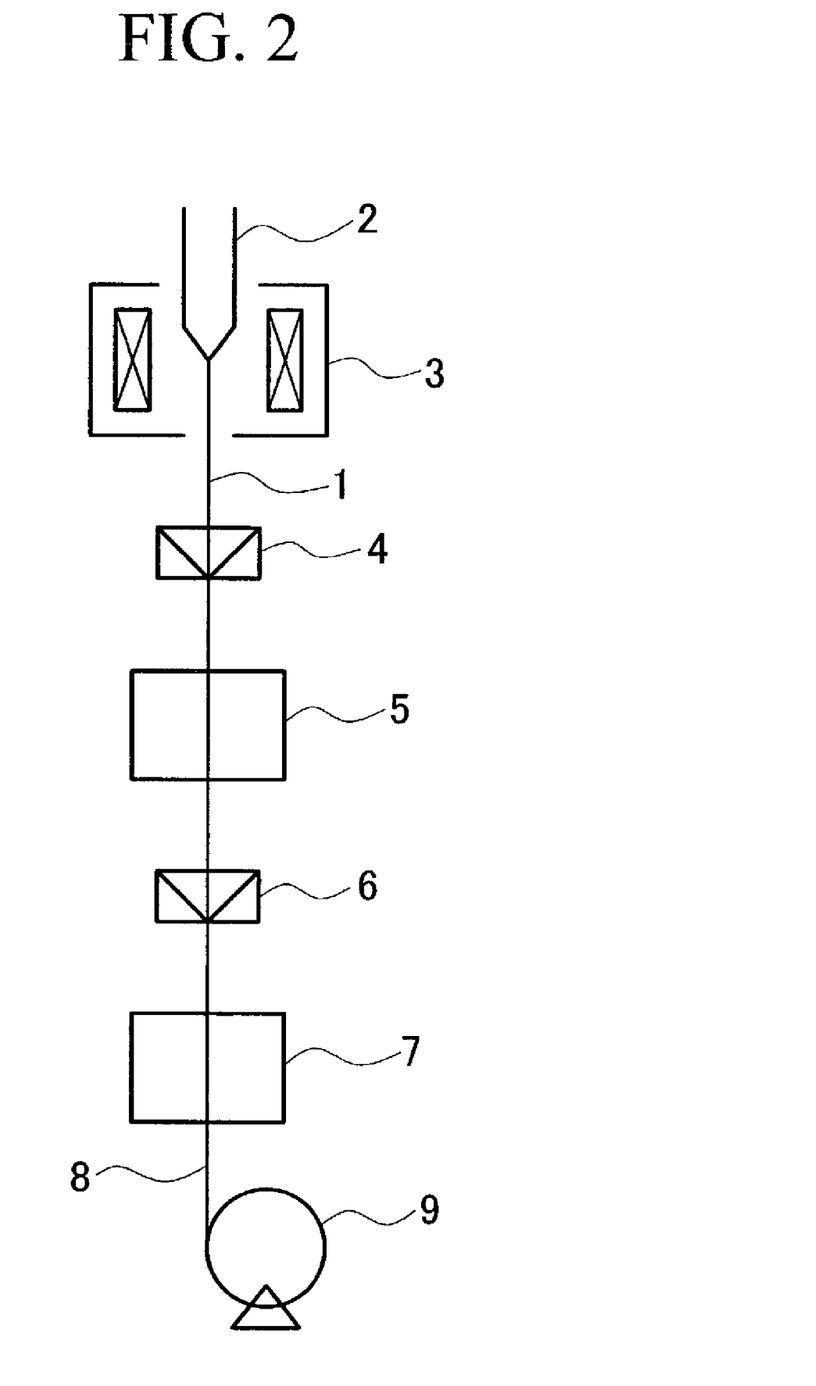
FIG. 2 is a general diagram of processes contained in the optical fiber drawing apparatus according to the present invention.

In FIG. 2, a reference numeral 1 indicates an optical fiber. The optical fiber 1 is formed by performing heat-melting processing so as to extend a raw material 2 of an optical fiber in a drawing furnace 3. A liquid first ultraviolet curable resin is applied to an outside of the optical fiber 1 by passing the optical fiber 1 through a first resin coating apparatus 4. Furthermore, by passing the optical fiber 1 through a first hardening apparatus 5 (UV lamp) for irradiation with ultraviolet light, the resin is hardened; thus, a first coating resin is formed on the optical fiber 1.

Consequently, a second coating resin layer such as an ultraviolet curable resin is formed on the first coating resin layer by passing the resin-coated optical fiber through a second resin coating apparatus 6 and a second hardening apparatus 7. A resin-coated optical fiber 8 is wound by a winding apparatus 9. The resin coating process is performed vertically.

Recently, it is required that the productivity of the optical fiber be improved in accordance with an increase in demand therefor. In particular, high speed ultraviolet curable resin coating processing is required to be realized. However, if high speed coating processing is realized, there is a problem in that ultraviolet curable resins cannot be applied stably and in uniform thickness.

For a solution to the above-mentioned problem, a coating process which is described in Japanese Examined Patent Application, Second Publication No. Hei 7-5336 is known. According to this coating process, defects in the coating resin is prevented from occurring in coating die by controlling the application temperature of the liquid ultraviolet curable resin and by controlling the viscosity of a region of the liquid ultraviolet curable resin, in which shear rate is slower than a critical shear rate, in the applying temperature with in a predetermined range. In this coating process, it is disclosed that the viscosity is in a range of 500 cps to 3000 cps in an application temperature of 60° C. to 100° C. in a region in which shear rate in the applying temperature is slower than a critical shear rate.

However, as disclosed in the above-mentioned prior art document, shear rate of an ordinary ultraviolet curable resin is in a range of $10^4$ to $10^5$ sec$^{-1}$. If the drawing process is performed while the shear rate must be slower than the critical shear rate, the line speed cannot be high. If a high speed drawing such as a line speed of 10 m/sec is performed, interfacial shear rate becomes quite high; thus, it easily becomes higher than its critical shear rate.

On the other hand, designing aspect of coating die becomes important along with an increasing drawing speed of the optical fiber. Japanese Examined Patent Application, Second Publication No. Hei 7-91092 is an example of such design for coating die. A coating die which is disclosed in this prior art document is explained with reference to FIGS. 3, 4, and 5 as follows.

Figure 3:
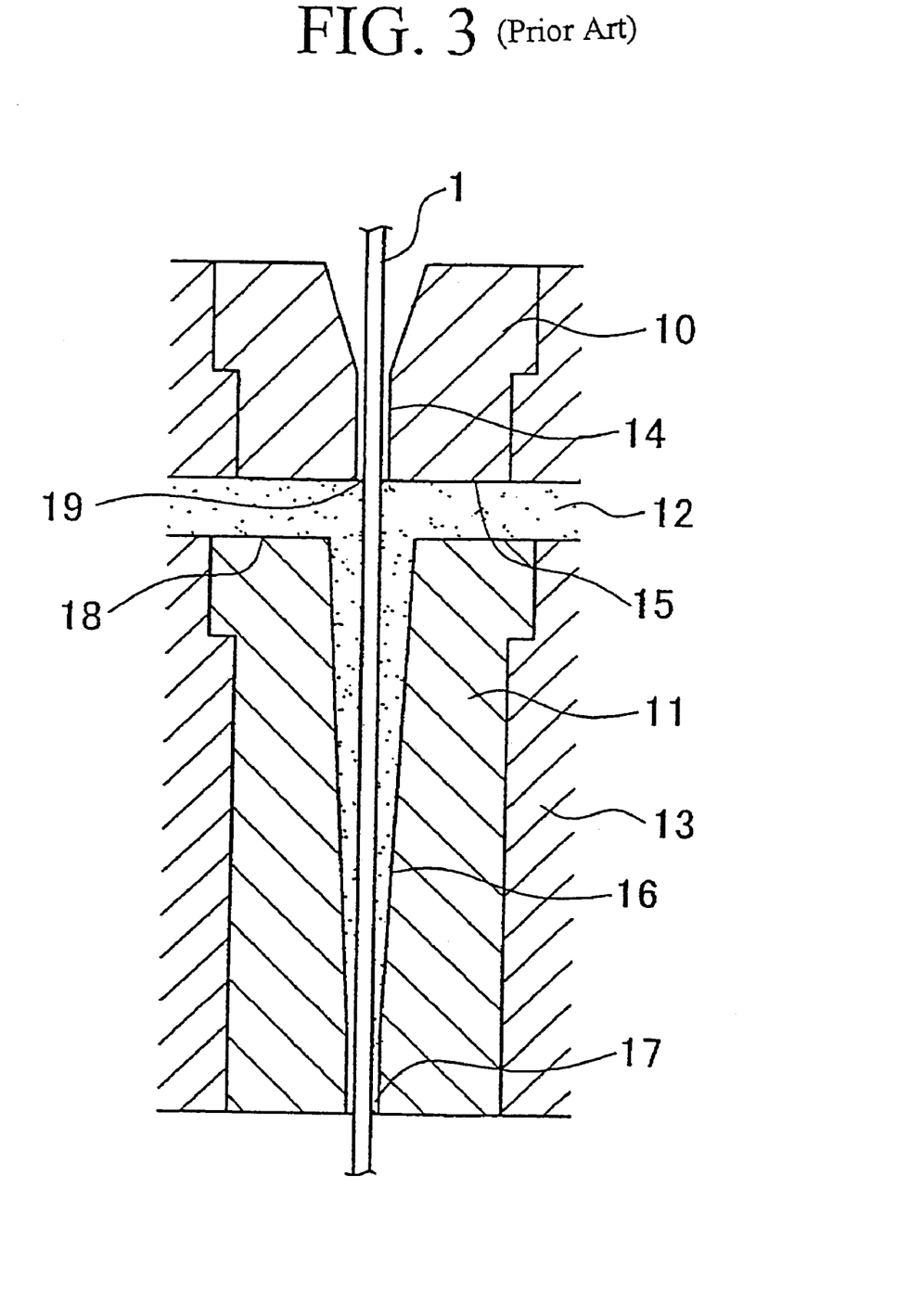
FIG. 3 is a cross section showing a conventional resin coating apparatus.

In FIG. 3, reference numeral 1 is an optical fiber. A resin 12 is applied to the optical fiber 1 while the optical fiber 1 is passing through a guiding die 10 and a die 11. Reference numeral 13 indicates a holder for supporting the guiding die 10 an the die 11. Reference numeral 14 indicates a guiding die hole. Reference numeral 15 indicates a bottom face of the guiding die. Reference numeral 16 indicates a tapered section of the die 11. Reference numeral 17 indicates an exit hole of the die 11. Reference numeral 18 indicates a top face of the die 11. A reference numeral 19 indicates a meniscus.

Figures 4A, 4B:
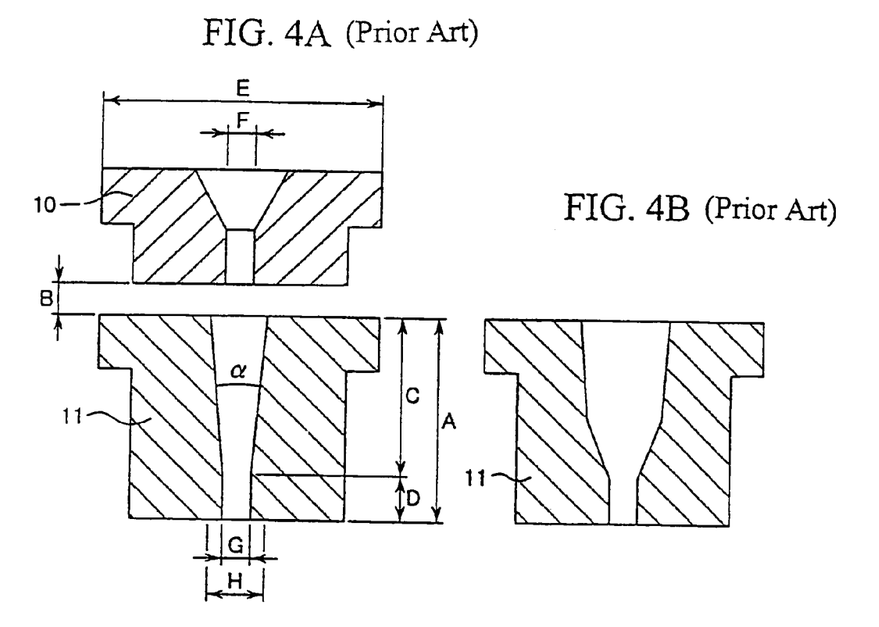
FIGS. 4A and 4B are cross sections showing an example of a guiding die and a die which are used in a conventional resin-coating apparatus.
Figure 5A:
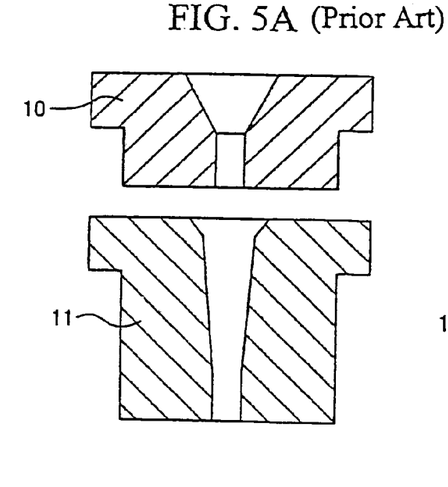
FIGS. 5A and 5B are cross sections showing another example of a guiding die and a die which are used in a conventional resin-coating apparatus.

In FIGS. 4A and 5A, the guiding die 10, a die 11, and shapes thereof are shown. In the above-mentioned prior art document, the relationship between B and H in FIG. 4, the relationship between G and C, the relationship between G and D, and the range of angle α are disclosed.

Figure 5B:
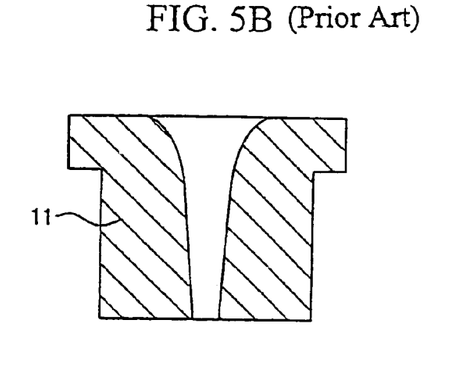

In the above-mentioned prior art document, a case in which a tapered section of the die 11 has two steps by modifying a structure shown in FIG. 4B is mentioned. However, the detail of such structure is not disclosed. Also, a case in which a tapered section of the dies 11 has a curve by modifying a structure shown in FIG. 5B is mentioned. However, the detail of such structure is not disclosed.

Also, the required shape of the die 11 is different between a case in which a resin is applied to an optical fiber and a case in which a resin is further applied to the resin-coated optical fiber. Furthermore, in actual drawing operation, while the drawing speed increases from a low speed such as a starting speed (for example, 0.5 m/sec) to a high speed in which a product is drawn on an operational basis (for example, 30 m/sec), temperature of an optical fiber which is coated by a resin is not fixed. Therefore, coating conditions becomes unstable to a certain degree. In order to obtain a high quality optical fiber, coating operation must be performed stably so as to avoid slipping phenomena of resin in each drawing speed range.

SUMMARY OF THE INVENTION

The present invention was made in consideration of the above-mentioned problems. An object of the present invention is to provide a drawing method for an optical fiber which can coat an optical fiber by resin stably even in a high speed drawing operation and high productivity and cost reduction can be realized. Another object of the present invention is to provide an optical fiber drawing die which is used for the drawing method.

In order to solve the above-mentioned problems, a first aspect of the present invention provides an optical fiber drawing die which is used for a resin coating apparatus for forming a resin coat by applying a resin to an optical fiber which is formed by drawing process to a raw material for an optical fiber which is characterized in that:

an interfacial shear rate of the optical fiber to the resin coat is calculated in accordance with a pressure value of resin inside a coating cup;

the interfacial shear rate is in a range of $-1.5 \times 10^5$ to 0 sec$^{-1}$.

A second aspect of the present invention provides an optical fiber drawing die, which is used for a resin coating apparatus for forming a resin coat by applying additional resin to a resin-coated optical fiber, characterized in that:

the interfacial shear rate of the optical fiber to the resin coat is calculated in accordance with a quantity of a coating resin;

the interfacial shear rate is in a range of $-3\times10^5$ to $2\times10^5$ sec$^{-1}$.

By doing this, it is possible to perform stable resin coating processing on the resin coated optical fiber even if the absolute value of interfacial shear rate exceeds $10^5$ sec$^{-1}$.

A third aspect of the present invention is an optical fiber drawing apparatus comprising:

a resin coating apparatus for applying a resin to an optical fiber using the optical fiber drawing die according to the first aspect of the present invention; and a resin coating apparatus for applying a resin to the resin-coated optical fiber by using the optical fiber drawing die according to the second aspect of the present invention.

By doing this, it is possible to realize an optical fiber drawing apparatus which can perform a resin coating operation stably even in a high speed drawing operation.

A fourth aspect of the present invention is an optical fiber drawing method for drawing an optical fiber by using an optical fiber drawing apparatus according to the third aspect of the present invention.

By doing this, it is possible to perform a stable resin coating operation stably even if an absolute value of the interfacial shear rate exceeds $10^5$ sec$^{-1}$. Therefore, it is possible to perform a drawing operation at high speed, and it is possible to realize a drawing method for an optical fiber which can realize high productivity and cost reduction.

As explained above, according to the present invention, interfacial shear rate of an optical fiber to a coating resin is calculated in accordance with a pressure value of resin inside a coating pocket, and an interfacial shear rate is set in a range of $-1.5\times10^5$ to 0 sec$^{-1}$. By doing this, it is possible to perform stable resin coating operation on an optical fiber even if the absolute value of interfacial shear rate exceeds $10^5$ sec$^{-1}$.

Also, the interfacial shear rate of the resin-coated optical fiber to the coated resin is calculated in accordance with the quantity of coating resin, and the interfacial shear rate is set in a range of $-3\times10^5$ to $2\times10^5$ sec$^{-1}$. By doing this, it is possible to perform stable resin coating operation in the resin-coated optical fiber even if the absolute value of the interfacial shear rate exceeds $10^5$ sec$^{-1}$.

Also, according to the present invention, interfacial shear rate is set according to different shapes of dies between dies for performing a resin-coating operation on an optical fiber and a die for performing resin-coating operation to the resin-coated optical fiber. Therefore, it is possible to realize an optical fiber drawing apparatus which can perform stable resin coating operation even in a high-speed drawing operation.

Also, according to the present invention, it is possible to perform stable resin coating operation even if an absolute value of the interfacial shear rate exceeds $10^5$ sec$^{-1}$. Therefore, it is possible to perform drawing operation at a high-drawing speed and to realize an optical fiber drawing method which can realize high productivity and cost reduction.

DETAILED DESCRIPTION OF THE INVENTION

An embodiment of the present invention is explained with reference to the drawings as follows.

Figure 1A:
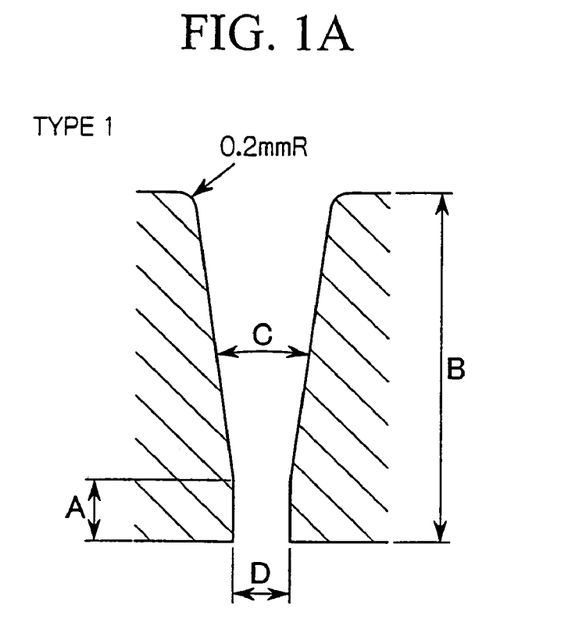
FIGS. 1A and 1B are cross sections of an optical fiber drawing die according to the present invention.
Figure 1B:
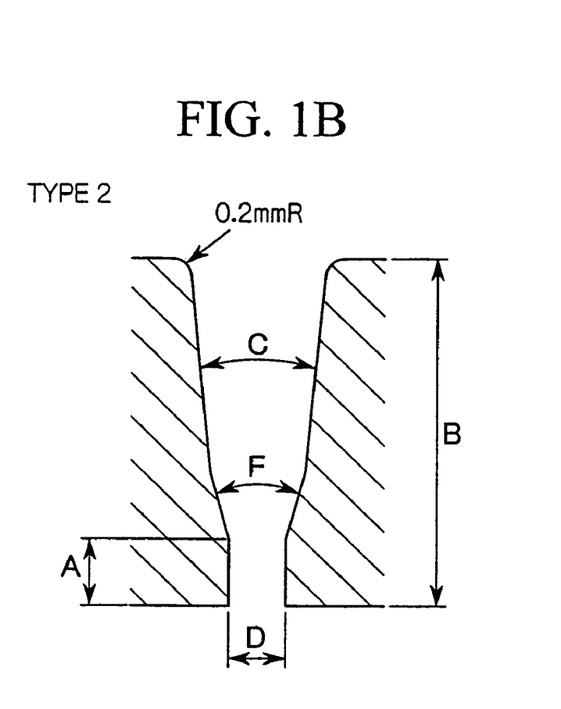

In FIGS. 1A and 1B, an example of an optical fiber drawing die according to the present invention is shown.

The drawing die is used in a first resin coating apparatus 4 which is contained in an optical fiber drawing apparatus shown in FIG. 2 and a second resin coating apparatus 6.

The shape of the drawing die is determined in accordance with dimensions A, B, D, and an angle C shown in FIG. 1A, and dimensions A, B, D, and an angle C and F shown in FIG. 1B. These dimensions and angles are determined in accordance with an interfacial shear rate of the optical fiber which is to be coated with a coating resin.

The basic formula for calculating the interfacial shear rate is as follows.

First, a solution of a Navier-Stokes equation F1 is calculated by using a boundary condition according to formulae F2 and F3.

$$\frac{\partial^2 v}{\partial r^2} + \frac{1}{r} \cdot \frac{\partial v}{\partial r} = \frac{1}{\mu} \cdot \frac{\partial p}{\partial z} \qquad \text{F1}$$

$$v = Vf \text{ at } r = Rf \qquad \text{F2}$$

$$v = 0 \text{ at } r = Rd \qquad \text{F3}$$

Here, v indicates a resin speed. r indicates a position in a radial direction. p indicates a pressure value. z indicates a position in an optical fiber under conditions that a forward direction is a positive direction. Rf indicates a radius of an optical fiber. Vf indicates speed of an optical fiber. Rd indicates a radius of a die (a function of Z).

A solution of the function of Z can be represented by a formula 4.

$$v(r, z) = \frac{r^2 - Rd^2}{4\mu} \cdot \frac{\partial p}{\partial z} + \frac{\ln(r/Rd)}{\ln(Rf/Rd)} \cdot \left( Vf + \frac{Rd^2 - Rf^2}{4\mu} \cdot \frac{\partial p}{\partial z} \right) \qquad \text{F4}$$

The interfacial shear rate can be represented by a formula 5 and formula F6 as follows.

$$\frac{\partial v(r)}{\partial r} = \frac{r}{2\mu} \cdot \frac{\partial p}{\partial z} + \frac{1}{r} \frac{1}{\ln(Rf/Rd)} \cdot \left( Vf + \frac{Rd^2 - Rf^2}{4\mu} \cdot \frac{\partial p}{\partial z} \right) \qquad \text{F5}$$

$$\lim_{r \to Rf} \frac{\partial v(r)}{\partial r} = \frac{1}{2\mu} \cdot \frac{\partial p}{\partial z} \left( Rf + \frac{Rd^2 - Rf^2}{2Rf \cdot \ln(Rf/Rd)} \right) + \frac{Vf}{Rf \cdot \ln(Rf/Rd)} \qquad \text{F6}$$

Here, a value of the right-hand side of the formula F6 such as ∂p/∂z is unknown. In order to obtain a value of ∂p/∂z, it is necessary to determine a pressure value $P_{ini}$ at an entrance of an upper part of the die and a pressure value $P_{out}$ at an exit of lower part of the die. Otherwise, it is necessary to introduce a flow amount Q. That is, if formulae F7 and F8 substitute a formula F6; thus, a formula F9 is obtained.

$$Q = \frac{\pi}{4}(Rc^2 - Rf^2) \quad \text{F7}$$

$$Q = 2\pi \int_{r=Rf}^{r=Rd} r \cdot v(r) dr \quad \text{F8}$$

$$\frac{\partial p}{\partial z} = -4\mu \cdot \frac{2Q/\pi \cdot \ln(Rf/Rd) + Vf \cdot (Rd^2 - Rf^2 + 2Rf^2 \cdot \ln(Rf/Rd))}{(Rd^2 - Rf^2)(Rd^2 - Rf^2 + \ln(Rf/Rd)(Rd^2 - Rf^2))} \quad \text{F9}$$

Here, integration range in the z axis direction is in a range in which a resin does not produce vortex flow.

When an optical fiber made from a glass is coated, interfacial shear rate is calculated by substituting a pressure value of coating resin in a coating pot into a $P_{ini}$ at an entrance of top of a die. When a resin-coated optical fiber is coated, an interfacial shear rate is calculated in accordance with a flow amount of resin which is calculated according to a coating diameter of resin which is already coated.

As a result of an experiment which is executed for the present embodiment, a range of stable interfacial shear rate is $-1.5 \times 10^5$ to $0$ sec$^{-1}$ when an optical fiber which is made from a glass is coated by resin. Also a range of stable interfacial shear rate is $-3 \times 10^5$ to $2 \times 10^5$ sec$^{-1}$ when a resin-coated optical fiber is coated.

An optical fiber drawing apparatus according to the present invention uses a die having $-1.5 \times 10^5$ to $0$ sec$^{-1}$ of interfacial shear rate in a first resin coating apparatus 4 for performing a resin coating operation on an optical fiber. An optical fiber drawing apparatus according to the present invention also uses a die having $-3 \times 10^5$ to $2 \times 10^5$ sec$^{-1}$ of interfacial shear rate in a second resin coating apparatus 6 for performing a resin coating operation to a resin-coated optical fiber. That is, such a structure is employed so as to improve drawing efficiency by having a die for coating an optical fiber by resin and a die for coating a resin-coated optical fiber respectively. The shapes of the die are different each other.

Also, an optical fiber drawing method according to the present invention uses the above-mentioned optical fiber drawing apparatus to perform a drawing operation for an optical fiber. By this method, it is possible to realize stable resin applying operation and productive drawing operation in an resin coating apparatus even in a high drawing speed.

Hereinafter, an example of a shape of an optical fiber drawing die and calculation of interfacial shear rate is shown as follows.

EXAMPLE 1

In an example for performing a resin coating operation on an optical fiber made from glass, an example of calculation of interfacial shear rate and drawing operation by using dies (types 1 and 2) shown in FIGS. 1A and 1B are performed under conditions that coating pressure is 0.3 Mpa, resin viscosity is 0.9, 1.5, and 2.0 Pa·sec, a glass diameter is 125 μm, and a finished-coated diameter is 190 μm. A result for the type 1 die is shown in TABLE 1. A result for the type 2 die is shown in a TABLE 2.

TABLE 1

| EVALUATION SPEED | | TYPE 1 | | | | | | | | | |
|---|---|---|---|---|---|---|---|---|---|---|---|
| | A[mm] | 0.2 | 0.1 | 0.05 | 0.5 | 1 | 0.2 | 0.2 | 0.1 | 0.5 | 0.1 |
| | B[mm] | 2.5 | 2.5 | 2.5 | 2.5 | 2.5 | 2.5 | 4 | 4 | 4 | 1.5 |
| | C[deg] | 8 | 8 | 8 | 8 | 8 | 20 | 8 | 8 | 8 | 8 |
| 20 m/sec | D[mm] | 0.255 | 0.250 | 0.245 | 0.270 | 0.285 | 0.260 | 0.250 | 0.245 | 0.262 | 0.256 |
| | SURFACE SHEARING SPEED [sec − 1] | −1.1e+5 | −3.0e+4 | 3.8e+4 | −2.3e+5 | −3.0e+5 | −1.5e+5 | −5.2e+4 | 4.7e+4 | −1.9e+5 | −1.3e+5 |
| | RESULT | ○ | ○ | ○ | X | X | △ | ○ | △ | X | ○ |
| 25 m/sec | D[mm] | 0.256 | 0.248 | 0.242 | | | 0.260 | 0.250 | | | 0.256 |
| | SURFACE SHEARING SPEED [sec − 1] | −1.5e+5 | −3.8e+4 | 5.2e+4 | | | −1.9e+5 | −6.8e+4 | | | −1.6e+5 |
| | RESULT | X | ○ | △ | | | X | ○ | | | △ |
| 30 m/sec | D[mm] | | 0.248 | 0.240 | | | | 0.248 | | | |
| | SURFACE SHEARING SPEED [sec − 1] | | −4.7e+4 | 7.1e+4 | | | | −8.8e+4 | | | |
| | RESULT | | ○ | X | | | | ○ | | | |

TABLE 2

TYPE 2

| EVALUATION SPEED | | | | | | | |
|---|---|---|---|---|---|---|---|
| | A[mm] | 0.1 | 0.2 | 0.3 | 0.6 | 0.2 | 0.2 |
| | B[mm] | 2.5 | 2.5 | 2.5 | 2.5 | 2.5 | 2.5 |
| | C[deg] | 8 | 8 | 8 | 8 | 8 | 20 |
| | E[mm] | 0.6 | 0.6 | 0.6 | 0.8 | 0.4 | 0.4 |
| | F[deg] | 25 | 25 | 25 | 25 | 25 | 25 |
| 20 m/sec | D[mm] | 0.242 | 0.250 | 0.257 | 0.270 | 0.248 | 0.258 |
| | SURFACE SHEARING SPEED [sec − 1] | 6.2e+4 | −8.0e+4 | −1.4e+5 | −2.4e+5 | −3.4e+4 | −1.5e+5 |
| | RESULT | Δ | ○ | ○ | X | ○ | Δ |
| 25 m/sec | D[mm] | | 0.252 | 0.257 | | 0.247 | 0.26 |
| | SURFACE SHEARING SPEED [sec − 1] | | −1.0e+5 | −1.8e+5 | | −4.6e+4 | −2.0e+5 |
| | RESULT | | ○ | X | | ○ | X |
| 30 m/sec | D[mm] | | 0.250 | | | 0.247 | |
| | SURFACE SHEARING SPEED [sec − 1] | | −1.4e+5 | | | −5.7e+4 | |
| | RESULT | | Δ | | | ○ | |

A, B, C, and D in the TABLE 1 indicate the same sections and angles shown in FIG. 1A. A, B, C, D, and E in the TABLE 2 indicate the same sections and angles shown in FIG. 1B. Symbols "○" in TABLES 1A and 1B mean that coating error did not occur regardless of resin viscosity and speed of resin coating operation such as accelerated speed phase or operational speed. Symbols "Δ" mean that at least one coating error occurred during the accelerated speed phase at at least one resin viscosity. Symbols "X" mean that an optical fiber broke because of abnormal coating during accelerated speed phase or an abnormal coating occurred during an operational speed.

EXAMPLE 2

In an example for performing a resin coating operation on a resin-coated optical fiber, interfacial shear rate is calculated by substituting an actual measured value so as to perform a drawing experiment by using dies (types 1 and 2) shown in FIGS. 1A and 1B under condition such that resin viscosities are 0.9, 1.5, and 2.0 Pa·sec, diameters of already-coated optical fibers were 190 μm. Results for the type 1 die are shown in TABLE 3. Results for the type 2 die are shown in TABLE 4.

TABLE 3

| EVALUATION SPEED | | | | | | | | | | |
|---|---|---|---|---|---|---|---|---|---|---|
| | A[mm] | 0.15 | 0.3 | 0.5 | 1 | 0.5 | 0.3 | 1 | 0.3 | 1 |
| | B[mm] | 2.5 | 2.5 | 2.5 | 2.5 | 2.5 | 1.5 | 1.5 | 4 | 4 |
| | C[deg] | 8 | 8 | 8 | 8 | 20 | 8 | 8 | 8 | 8 |
| 20 m/sec | D[mm] | 0.257 | 0.263 | 0.268 | 0.275 | 0.280 | 0.267 | 0.280 | 0.262 | 0.272 |
| | SURFACE SHEARING SPEED [sec − 1] | 6.2e+5 | 3.2e+5 | 1.3e+5 | −6.6e+4 | −1.7e+5 | 1.7e+5 | −1.7e+5 | 3.5e+5 | 1.0e+4 |
| | RESULT | X | Δ | ○ | ○ | ○ | ○ | ○ | X | ○ |
| 25 m/sec | D[mm] | | 0.265 | 0.270 | 0.277 | 0.280 | 0.268 | 0.280 | | 0.275 |
| | SURFACE SHEARING SPEED [sec − 1] | | 3.0e+5 | 8.5e+4 | −1.4e+5 | −2.1e+5 | 1.6e+5 | −2.1e+5 | | −8.2e+4 |
| | RESULT | | Δ | ○ | ○ | ○ | ○ | ○ | | ○ |
| 30 m/sec | D[mm] | | 0.267 | 0.270 | 0.277 | 0.282 | | | | 0.275 |
| | SURFACE SHEARING SPEED [sec − 1] | | 3.7e+5 | 1.1e+5 | −2.2e+5 | −2.4e+5 | | | | −1.2e+5 |
| | RESULT | | X | ○ | Δ | ○ | | | | ○ |

TABLE 4

| EVALUATION SPEED | | | | | | | | |
|---|---|---|---|---|---|---|---|---|
| | A[mm] | 0.15 | 0.4 | 0.6 | 1 | 0.4 | 0.4 | 0.4 |
| | B[mm] | 2.5 | 2.5 | 2.5 | 2.5 | 2.5 | 2.5 | 2.5 |
| | C[deg] | 4 | 4 | 4 | 4 | 10 | 4 | 4 |
| | E[mm] | 0.6 | 0.6 | 0.8 | 1.2 | 0.6 | 0.6 | 0.6 |
| | F[deg] | 25 | 25 | 25 | 25 | 25 | 25 | 25 |
| 20 m/sec | D[mm] | 0.260 | 0.267 | 0.272 | 0.277 | 0.280 | 0.266 | 0.268 |
| | SURFACE SHEARING SPEED [sec − 1] | 4.6e+5 | 1.7e+5 | 1.0e+4 | −1.1e+5 | −1.7e+5 | 2.0e+5 | −1.3e+5 |
| | RESULT | X | ○ | ○ | ○ | ○ | ○ | ○ |
| 25 m/sec | D[mm] | | 0.267 | 0.272 | 0.280 | 0.283 | 0.266 | 0.268 |
| | SURFACE SHEARING SPEED [sec − 1] | | 2.1e+5 | 1.3e+4 | −2.1e+5 | −2.8e+5 | 2.5e+5 | 1.6e+5 |
| | RESULT | | Δ | ○ | ○ | ○ | X | ○ |
| 30 m/sec | D[mm] | | | 0.274 | 0.280 | 0.283 | | |
| | SURFACE SHEARING SPEED [sec − 1] | | | 4.2e+4 | −2.7e+5 | −3.2e+5 | | |
| | RESULT | | | ○ | ○ | Δ | | |

Symbols such as "○", "Δ", and "×" in TABLES 3 and 4 have the same meanings the cases in TABLES 1 and 2. When a drawing operation was impossible because the optical fiber broke, a value which was inferred by data obtained from a case of low line speed was used instead.

According to the above results, a stable range for interfacial shear rate is preferably $-1.5 \times 10^5$ to 0 $\sec^{-1}$ in a case in which an optical fiber made from a glass is coated by resin. It is preferable that a coated optical fiber be coated at a stable interfacial shear rate within a range of $-3 \times 10^5$ to $2 \times 10^5$ $\sec^{-1}$. According to this example of an optical fiber drawing die, interfacial shear rate of an optical fiber to the coated resin is calculated in accordance with a pressure value of resin inside a coating pot, and the interfacial shear rate is set in a range of $-1.5 \times 10^5$ to 0 $\sec^{-1}$. Therefore, it is possible to perform a stable resin coating operation on an optical fiber even when an absolute value of the interfacial shear rate exceeds $10^5$ $\sec^{-1}$.

Also, according to this example of an optical fiber drawing die, interfacial shear rate of the resin-coated optical fiber of the coated resin is calculated in accordance with a coated-resin diameter, and interfacial shear rate is set in a range of $-3 \times 10^5$ to $2 \times 10^5$ $\sec^{-1}$. Therefore, it is possible to perform a stable resin coating operation on the resin-coated optical fiber even when an absolute value of the interfacial shear rate exceeds $10^5$ $\sec^{-1}$.

Also, in this example of an optical fiber drawing apparatus, interfacial shear rate is set according to different shapes of dies between a die for performing a resin-coating operation to an optical fiber and a die for performing resin-coating operation on a resin-coated optical fiber. Therefore, it is possible to perform a stable resin coating operation even in a high-speed drawing operation.

Also, in this example of an optical fiber drawing method, it is possible to perform stable resin coating operation by using the above-mentioned optical fiber drawing apparatus even if the absolute value of interfacial shear rate exceeds $10^5$ $\sec^{-1}$. Therefore, it is possible to perform drawing operation at higher drawing speed and to realize an optical fiber drawing method which can realize high productivity and cost reduction.

What is claimed is:

1. An optical fiber drawing method for drawing an optical fiber using an optical fiber drawing apparatus, the optical fiber drawing apparatus comprising a first resin coating apparatus and a second resin coating apparatus, the first resin coating apparatus comprising a first optical fiber drawing die and a coating cup, the second resin coating apparatus comprising a second optical fiber drawing die, the method comprising the steps of:
    calculating an interfacial shear rate for a drawing speed of at least 20 m/sec in accordance with a pressure value of resin inside the coating cup;
    forming a resin-coated optical fiber, the act of forming comprising applying a resin coat to the optical fiber using the first resin coating apparatus at the interfacial shear rate and at the drawing speed of at least 20 m/sec, wherein the interfacial shear rate of the optical fiber to the resin is within a range of $-1.5 \times 10^5$ to 0 $\sec^{-1}$;
    calculating a second interfacial shear rate of the resin-coated optical fiber to the resin in accordance with a diameter of the resin coat; and
    applying a second resin coat to the resin-coated optical fiber using the second resin coating apparatus at the second interfacial shear rate and at the drawing speed of at least 20 m/sec, wherein the second interfacial shear rate is within a range of $-3 \times 10^5$ to $2 \times 10^5$ $\sec^{-1}$.

2. An optical fiber drawing method for drawing an optical fiber using an optical fiber drawing apparatus, the optical fiber drawing apparatus comprising a resin coating apparatus for applying resin to an optical fiber using an optical fiber drawing die characterized by an interfacial shear rate of the optical fiber to a resin coat being within a range of $-1.5 \times 10^5$ to 0 $\sec^{-1}$ for a drawing speed of at least 20 m/sec, the resin coating apparatus comprising a resin coating cup, the method comprising the steps of:
    forming the optical fiber by performing a drawing process on a raw material;
    calculating a predetermined interfacial shear rate of the optical fiber to the resin coat in accordance with a pressure value of resin inside the resin coating cup;

applying the resin coat using the optical fiber drawing die at the predetermined interfacial shear rate and at a drawing speed including at least 20 m/sec, the predetermined interfacial shear rate being within the range of $-1.5 \times 10^5$ to $0$ sec$^{-1}$.

3. The method of claim 2, further comprising:
calculating the predetermined interfacial shear rate in accordance with the pressure value of resin inside the resin coating cup, according to:

$$\lim_{r \to Rf} \frac{\partial v(r)}{\partial r} = \frac{1}{2\mu} \cdot \frac{\partial p}{\partial z}\left(Rf + \frac{Rd^2 - Rf^2}{2Rf \cdot \ln(Rf/Rd)}\right) + \frac{Vf}{Rf \cdot \ln(Rf/Rd)},$$

where $$\lim_{r \to Rf} \frac{\partial v(r)}{\partial r}$$

is the interfacial shear rate, $\mu$ is a viscosity of the resin $$\frac{\partial p}{\partial z}$$

represents a change in resin pressure as a function of a length z of the optical fiber drawing die, Rf represents a radius of the optical fiber, Rd represents a radius of the die as a function of length, Vf represents a speed of the optical fiber along the length and ln represents a natural logarithm function.

4. A method for forming a second resin coat on a resin-coated optical fiber using an optical fiber drawing die in a resin coating apparatus, the resin-coated optical fiber having a diameter of a resin coat, the optical fiber drawing die being characterized by an interfacial shear rate being within a range of $-3 \times 10^5$ to $2 \times 10^5$ sec$^{-1}$ for a drawing speed of the resin-coated optical fiber of at least 20 m/sec, the method comprising the steps of:
calculating a predetermined interfacial shear rate of the resin-coated optical fiber to the resin coat in accordance with the diameter of the resin coat, and
applying the second resin coat using the optical fiber drawing die at the predetermined interfacial shear rate and at the drawing speed of at least 20 m/sec, the predetermined interfacial shear rate being within the range of $-3 \times 10^5$ to $2 \times 10^5$ sec$^{-1}$.

5. The method of claim 4, further comprising:
calculating the interfacial shear rate in accordance with the diameter of the resin coat according to:

$$\lim_{r \to Rf} \frac{\partial v(r)}{\partial r} = \frac{1}{2\mu} \cdot \frac{\partial p}{\partial z}\left(Rf + \frac{Rd^2 - Rf^2}{2Rf \cdot \ln(Rf/Rd)}\right) + \frac{Vf}{Rf \cdot \ln(Rf/Rd)},$$

where $$\lim_{r \to Rf} \frac{\partial v(r)}{\partial r}$$

is the interfacial shear rate, $\mu$ is a viscosity of the resin $$\frac{\partial p}{\partial z}$$

represents a change in resin pressure as a function of length z of the die, Rf represents a radius of the optical fiber, Rd represents a radius of the die as a function of length, Vf represents a speed of the optical fiber along the length and ln represents a natural logarithm function, and wherein $$\frac{\partial p}{\partial z}$$

is calculated according to:

$$\frac{\partial p}{\partial z} = -4\mu \cdot \frac{2Q/\pi \cdot \ln(Rf/Rd) + Vf \cdot (Rd^2 - Rf^2 + 2Rf^2 \cdot \ln(Rf/Rd))}{(Rd^2 - Rf^2)(Rd^2 - Rf^2 + \ln(Rf/Rd)(Rd^2 - Rf^2))},$$

wherein Q is a flow rate equal to $$\frac{\pi}{4}(Rc^2 - Rf^2),$$

wherein Rc is a radius of the resin coat.

* * * * *